(No Model.)

L. ZWIESLER.
WEIGHING AND MEASURING SCOOP.

No. 405,648. Patented June 18, 1889.

Witnesses
F. G. Fischer
A. A. Higdon

Inventor
L. Zwiesler
By his Attorney
J. C. Higdon

United States Patent Office.

UNITED STATES PATENT OFFICE.

LOUIS ZWIESLER, OF KANSAS CITY, MISSOURI, ASSIGNOR OF ONE-HALF TO JOSEPH MENCLEN, OF SAME PLACE.

WEIGHING AND MEASURING SCOOP.

SPECIFICATION forming part of Letters Patent No. 405,648, dated June 18, 1889.

Application filed February 13, 1889. Serial No. 299,716. (No model.)

*To all whom it may concern:*

Be it known that I, LOUIS ZWIESLER, of Kansas City, Jackson county, Missouri, have invented certain new and useful Improvements in Measuring and Weighing Scoops, of which the following is a full, clear, and exact description, reference being had to the accompanying drawings forming a part thereof.

This invention is directed to certain improvements in scoops, and more especially measuring-scoops, being adapted to not only serve as a means to conveniently take up or handle certain substances—as, for instance, flour, sugar, coffee, grain, &c.—but also to effect the measurement of the contents of the scoop, as also to indicate the weight of said contents; and to these ends the nature of the invention consists in the novel combination and arrangement of parts hereinafter set forth, and pointed out in the claim.

Figure 1:
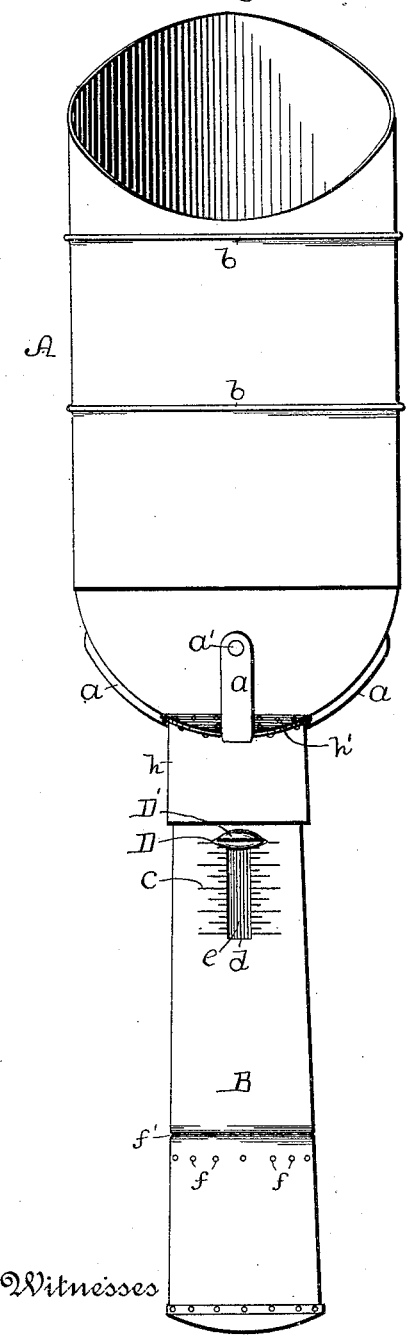
Figure 2:
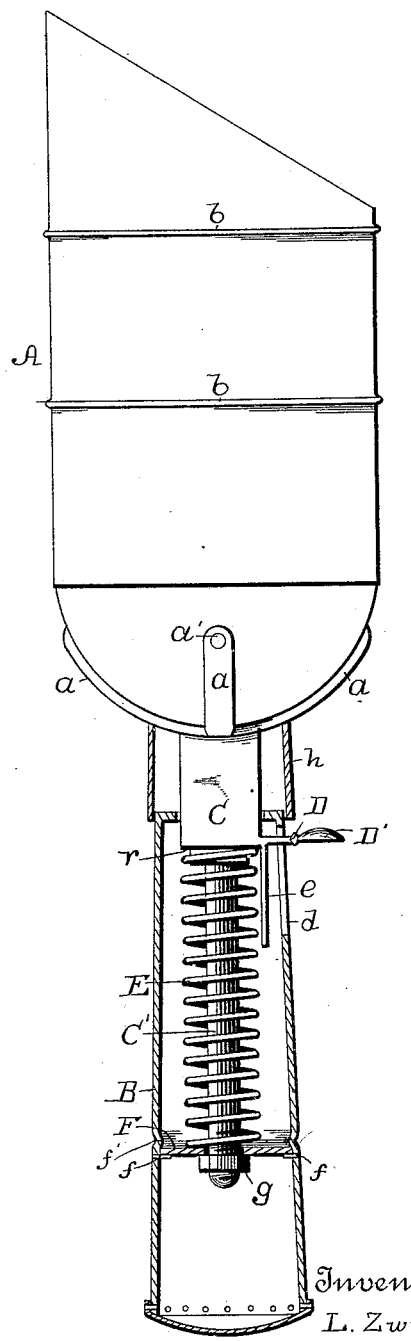

In the drawings, Figure 1 is a front elevation of my improved scoop, and Fig. 2 is a partly side elevation and partly sectional view of the same.

In the embodiment of my invention I employ a scoop-bowl A, preferably cylindrical in cross-section, the greater portion of its length being tapered at its outer end to a point, as shown, to aid in introducing the same into the substance it is desired to take up. This bowl is formed or provided at the required intervals with beads $b\,b$, to divide up its chambers, so as to indicate pints, quarts, &c., for the measurement of the contents of the scoop, as may be necessary. The scoop-bowl A has applied to its preferably round or semi-cylindric bottom upon the outside the rectangular bar C, the latter having a spider-like arrangement of arms $a\,a$, embracing and riveted at $a'$ to the said end portion of the scoop-bowl. The bar C has screwed to or formed with it a rod C', which, together with the inner end of the bar C, enters and is inclosed by the hollow handle B. The rod C' has applied to its extreme inner screw-threaded end, upon the inner side of a partition or diaphragm F, a nut $g$, while encircling said rod is a spring E, bearing against the bar C and the partition or diaphragm F. This cushions the scoop-bowl in the handle B and permits of the inward yielding of the same under the pressure of its contents, the weight thereof thus being determined with the aid of a pointer or index D, projecting from the bar C through a slot $d$ in the handle, and a scale or graduations $c$ marked upon the latter at the sides of said slot. A thumb piece or rest D' projects from the pointer or index D, whereby the index or pointer can be pressed bodily against the outer or upper edge of the slot $d$, and thus effect the holding of the scoop-bowl firmly in position against being moved inward while scooping or taking up the substance preliminary to the measurement or weighing of the same. A shield or plate $e$ also projects from said index or pointer, but downwardly, obscuring from view through the slot $d$ the spring and rod within the handle. A sleeve $h$ also projects from the inner end of the scoop-bowl A, and contains the bar C, fitting at its free end around the inner end of the handle B, also serving as a guide to steady the inward movement and to aid in properly holding the scoop-bowl in position.

I do not broadly claim a scoop-bowl having a cushioned or spring connection with its handle and a pointer or index registering with graduations upon the handle, as I am aware that such is not new; but,

Having thus fully described my invention, what I claim as new, and desire to secure by Letters Patent, is—

In a weighing-scoop, the combination of a bowl, a spring-encircled rod having its upper end connected to said bowl, the hollow handle having a slot in one side, a partition or diaphragm located in the handle, a nut fitted upon the inner end of said rod in contact with said partition or diaphragm, a series of graduations formed upon said handle at the sides of said slot, and the combined index and thumb-piece D', projecting through said slot in the handle, substantially as and for the purpose specified.

In testimony whereof I affix my signature in presence of two witnesses.

LOUIS ZWIESLER.

Witnesses:
F. G. FISCHER,
A. A. HIGDON.